Figure 1:
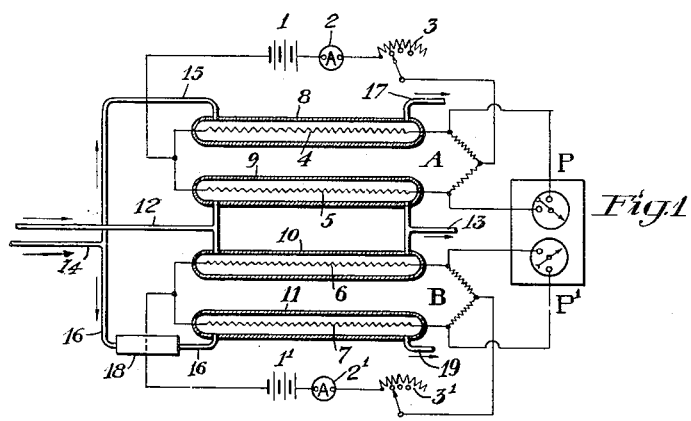

Oct. 11, 1927. 1,644,951
O. RODHE
CONTINUOUSLY OPERATING GAS ANALYZING APPARATUS
Filed Dec. 15, 1922

Inventor
Olof Rodhe
By Knight Gray
Atty.

Patented Oct. 11, 1927.

1,644,951

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION.

CONTINUOUSLY-OPERATING GAS-ANALYZING APPARATUS.

Application filed December 15, 1922, Serial No. 607,204, and in Sweden December 15, 1921.

Continuously-operating gas analyzing apparatuses for determining for instance carbon dioxide in flue gases are previously known, said apparatuses being based on the fact, that carbon dioxide has a thermal conductivity different from that of the other constituents of the flue gases—carbon monoxide, hydrocarbon, oxygen and nitrogen. Such apparatuses may consist of two identical metal wires for instance of platinum, enclosed in separate cells and connected into an electrical circuit so as to each form an arm of a Wheatstone bridge. If an electrical current passes through said circuit, the wires will be heated and thus give off heat to the surrounding air or gas and to the walls of the cells. Now, if the two cells are passed by gases of different thermal conductivity, the quantities of heat given off by the wires to the gases will be different, the one of the wires being maintained at a higher temperature than the other. The difference of temperature will cause a difference in the resistance of the two wires, causing a deflection of a galvanometer or the like inserted in the circuit, the magnitude of the said deflection being dependent on the difference between the thermal conductivities of the two gases.

Continuously-operating gas analyzing apparatuses indicating or recording two or more analyses at the same time have not been constructed heretofore, probably on account of the gases considered in addition to carbon dioxide, viz carbon monoxide, hydrocarbon, oxygen and nitrogen, having substantially the same thermal conductivity, and therefore the small variations generally occurring in connection with said gases will not cause any visible deflection of the galvanometer. Moreover, with simultaneous variations in for instance carbon dioxide and unburnt gases—carbon monoxide and hydrocarbon—the deflections will be uninterpretable, as the influences of the two variations on the galvanometer cannot be separated.

The present invention relates to a continuously-operating gas analyzing apparatus, in which two or more gaseous constituents are examined and their percentages recorded or indicated. The invention consists essentially in the apparatus being provided with two or more separate analyzing cells, the one of which serves to determine the percentage of one gaseous constituent, while the other analyzing cell or cells serves or serve to determine the percentage of another gaseous constituent or other constituents. Said gaseous constituent may consist of either identical or different gases of different gaseous mixtures or different gases of one and the same gaseous mixture.

In the latter case, when the percentage of different gases of one and the same gas mixture is to be determined, the one analyzing cell serves to determine the percentage of one gaseous constituent of an unmodified gaseous mixture, while the other analyzing cell or cells serves or serve to determine the percentage of another gaseous constituent or other constituents of a modified gaseous mixture.

Usually the different gaseous constituents are examined in relation to a neutral gas for instance air enclosed in a cell used for comparison. Preferably, a common cell of comparison for said gas of comparison is used for all analyses. Moreover, by so arranging, that always at least one of the gaseous constituents is included in all analyses, a greater clearness is obtained in recording or indicating the results of the analyses.

The different analyses may be recorded on separate charts or be indicated each by a separate stylus, or they may be recorded on a common chart, or indicated by a common stylus.

The different analyzing cells may be coupled in parallel or in series, and in front of one or more of the analyzing cells or between two of them, reaction vessels or absorbing vessels may be provided in order to modify the gaseous mixture.

The galvanometers in use may be adapted for indication only or for recording only, or, both for indication and recording.

In the following the invention will be disclosed more fully by describing a particular case, viz the analysis of flue gases with respect to their contents of carbon dioxide in part and unburnt gases in part—carbon monoxide and hydrocarbon—in an apparatus of the type set forth hereinabove, but it should be pointed out, that the invention is in no way restricted to said particular case with only two gases nor to exactly the said special gases nor to the said type of continuously-operating gas analyzing apparatus.

Figure 2:
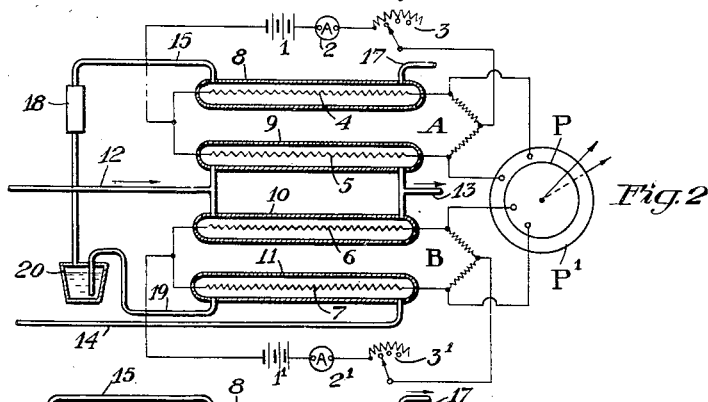
Figure 3:
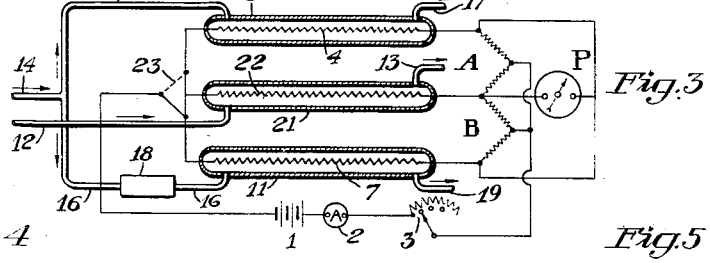
Figures 4, 5:
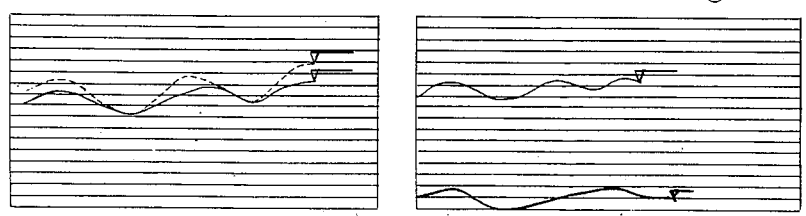
Figure 6:
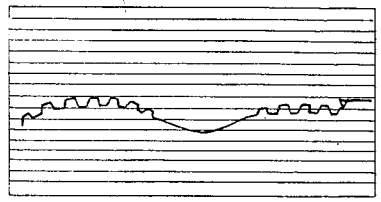

The accompanying drawings illustrate a few embodiments of the invention. Fig. 1 is a diagrammatic view of a gas analyzing apparatus for determining the percentage partly of carbon dioxide and partly of the sum of carbon dioxide and unburnt gases—carbon monoxide and hydrocarbon. Fig. 2 is a diagrammatic view of a gas analyzing apparatus for determining the percentage partly of carbon dioxide, and partly of unburnt gases—carbon monoxide and hydrocarbon, the two analyzing cells being coupled in series. Fig. 3 is a diagrammatic view of a gas analyzing apparatus similar to the apparatus shown in Fig. 1, but in which a common cell of comparison is used. Figs. 4, 5 and 6 show different diagrams.

Referring to Fig. 1, A and B are two electrical circuits, arranged as Wheatstone bridges. The two circuits are supplied with current from the batteries 1, $1^1$ through the ammeters 2, $2^1$ and the adjustable resistances 3, $3^1$. Inserted in each arm of each bridge circuit A and B are resistance wires or helices 4, 5 and 6, 7 respectively, these being enclosed in hollow cells 8, 9 and 10, 11 respectively, through which the gaseous mixture to be analyzed and a neutral gas for comparison such as air are passing. Through the pipe 12 air is sucked or pressed into the cells 9 and 10, and exhausted therefrom through the pipe 13. The flue gases enter through the pipe 14, branched in two pipes 15 and 16, the one 15 of which leads to the cell 8, from which the gases escape into the atmosphere through the pipe 17, while the other pipe 16 leads to an oxidizing furnace 18 of known type, from which the gases pass through the cell 11 and escape into the atmosphere through the pipe 19. The furnace 18 is electrically heated and contains a metal oxide for instance copper oxide or iron oxide, causing the unburnt constituents of the flue gases—carbon monoxide and hydrocarbon—passing therethrough to be oxidized to carbon dioxide. By inserting in the pipes 12 and 15 and in pipe 16 moisture regulators of known type, the gaseous mixture to be analyzed and the air are saturated with humidity, and water will perhaps be separated from supersaturated gas. By said regulators the gases and the air are caused to assume the same constant temperature. Inserted in the circuits A and B are galvanometers P and $P^1$ or recording mechanisms of known type.

The mode of operation is as follows:

By the current from the battery 1 the resistance wires 4, 5 in the circuit A are heated, said wires giving off heat to the walls of the cells 8, 9 and to the current of gas or air passing through said cells. The different composition of said currents and the different thermal conductivities as a consequence thereof cause the temperatures and the resistances of the wires to be different, a deflection of the galvanometer P or a recording on the corresponding chart being obtained thereby. In the same way the wires 6, 7 of the circuit B obtain different temperatures and, consequently, different resistances, causing a deflection of the galvanometer $P^1$ or a recording on the corresponding chart. The adjustable resistances 3 and $3^1$ serve to compensate for variations of the potential of the batteries, thus enabling the apparatus to record or indicate zero, when the percentage of $CO_2$ is zero. The galvanometers are preferably so graduated that they give directly the percentage of the analyzed constituents, in this case carbon dioxide, and the sum of carbon dioxide and unburnt gases.

In the apparatus described above the galvanometer P will record the percentage of carbon dioxide and the galvanometer $P^1$ will record the percentage of carbon dioxide + unburnt gases (carbon monoxide and hydrocarbon) in the flue gases. A diagram taken with said apparatus is shown in Fig. 4. The curve drawn in full represents the percentage of $CO_2$ and the dotted-line curve represents the percentage of $CO_2 + CO + CH_4$. Thus the difference of the curves represents the percentage of unburnt gases of the flue gases.

In the apparatus shown in Fig. 2 the gas (air) used for comparison enters the cells 9 and 10 through the pipe 12 and escapes through the pipe 13. The gaseous mixture to be analyzed (flue gases) enters through the pipe 14, passes through the cell 11 and thence through the pipe 19 into an absorbing vessel 20 for carbon dioxide, containing for instance potassium hydrate, and further into the electrical furnace 18, from which it is introduced into the cell 8 through the pipe 15 and escapes into the atmosphere through the pipe 17. The cells 8 and 11 are thus coupled in series, and through the cell 11 pass flue gases of the original composition, while the gaseous mixture passing through the cell 8 is deprived of its content of carbon dioxide in the absorbing vessel 20, and is then subjected to oxidation in the electrical furnace 18, causing the unburnt gases—carbon monoxide and hydrocarbon—to be converted into carbon dioxide of the same volume. In this apparatus, too, means are provided to maintain the gaseous mixture and the air at the same constant temperature and at the same degree of humidity.

The apparatus operates in the same manner as that shown in Fig. 1. The galvanometer P will record or indicate the percentage of carbon dioxide, and the galvanometer $P^1$ will record or indicate the percentage of unburnt gases (carbon monoxide and hydrocarbon).

If this apparatus is used with the galvanometers shown in Fig. 1 the diagram recorded will be similar to that shown in Fig.

5. The lower curve represents the percentage of unburnt gases—carbon monoxide and hydrocarbon—and the upper curve represents the percentage of carbon dioxide.

With this apparatus, it is possible, however, to obtain a diagram similar to that shown in Fig. 4, that is to say a diagram where the one curve is superposed upon the other. This may be effected by so connecting the galvanometers or the recording mechanisms, that the one pointer or stylus will positively bring the other pointer or stylus along with it the deflection or recording of such other pointer or stylus caused by the analysis being then added to the deflection or recording of the first pointer or stylus. The one galvanometer may for instance be attached in its entirety to the pointer of the other galvanometer.

In the embodiment shown in Fig. 3, a cell of comparison common to both analyzing cells is used, the cells 9 and 10 together with the resistance wires 5, 6 being replaced by a single cell 21 with the resistance wire 22. The gas (air) of comparison enters through the pipe 12, passes through the cell 21 and escapes into the atmosphere through the pipe 13. The gaseous mixture to be analyzed enters through the pipe 14 which is branched in two pipes 15 and 16, the one 15 of which leads directly to the cell 8, whence the gas mixture escapes into the atmosphere through the pipe 17, while there is inserted in the other branch 16 an oxidizing furnace 18 in front of the cell 11, from which cell the gaseous mixture escapes in the atmosphere through the pipe 19. A switch 23 is provided to connect alternately one of the circuits A or B to the battery 1, and said switch may be actuated manually or automatically with a given periodicity.

The apparatus operates similarly to those above described. The common galvanometer P records alternatively the percentage of carbon dioxide and the sum of the percentage of carbon dioxide and that of unburnt gases.

A diagram taken with this apparatus is shown in Fig. 6, the lower curved portions representing the percentage of carbon dioxide and the upper curved portions representing the percentage of unburnt gases—carbon dioxide and hydrocarbon.

What I claim as new and desire to secure by Letters Patent of the United States of America is:—

1. A continuously operating gas analyzing apparatus in which analyses take place continuously in order to determine different constituents in one and the same gas mixture, comprising two separate groups of analyzing cells for determining the percentage of carbon dioxide, means to conduct gaseous mixture to be analyzed through the one of said groups to determine the percentage of carbon dioxide in said mixture, means arranged before the other group to oxidize carbon monoxide and methane to carbon dioxide, and means to conduct the gaseous mixture thus oxidized through said other group in order to determine the percentage of carbon dioxide in said mixture.

2. A continuously operating gas analyzing apparatus in which analyses take place continuously in order to determine different constituents in one and the same gas mixture comprising two separate groups of cells connected in parallel, means to conduct part of the gaseous mixture to be analyzed through one of said groups, means arranged before the second group to modify the gaseous mixture as to its composition, means to conduct part of the mixture to be analyzed through said modifying means, and means to conduct the mixture thus modified through the other of said groups of cells.

In testimony whereof I affix my signature.

OLOF RODHE.